United States Patent
Lele et al.

(10) Patent No.: US 6,794,467 B2
(45) Date of Patent: *Sep. 21, 2004

(54) PROCESS FOR THE PREPARATION OF POLYMERIC ABSORBENTS

(75) Inventors: Ashish Kishor Lele, Pune (IN); Shyni Varghese, Pune (IN); Manohar Virupax Badiger, Pune (IN); Raghunath Anant Mashelkar, Pune (IN)

(73) Assignee: Council of Scientific and Industrial Research, New Delhi (IN)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/537,450

(22) Filed: Mar. 27, 2000

(65) Prior Publication Data

US 2003/0187172 A1 Oct. 2, 2003

(51) Int. Cl.[7] .................................................. C08F 4/72
(52) U.S. Cl. ....................... 526/112; 526/141; 526/171; 526/184; 526/219.6; 526/230; 526/142; 526/288; 526/140; 526/303.1; 526/307.2; 526/318.3
(58) Field of Search .................................. 526/112, 141, 526/142, 171, 140, 184, 288, 303.1, 307.2, 318, 219.6, 317.1; 524/556, 379

(56) References Cited

U.S. PATENT DOCUMENTS

| | | | | |
|---|---|---|---|---|
| 4,365,971 A | * | 12/1982 | Monick | 44/7 |
| 4,540,510 A | * | 9/1985 | Karl | |
| 4,624,795 A | * | 11/1986 | Dawson et al. | 252/8.553 |
| 4,729,834 A | * | 3/1988 | Itoh et al. | 210/670 |
| 4,952,327 A | * | 8/1990 | Amjad et al. | 210/701 |
| 5,112,391 A | * | 5/1992 | Owen et al. | 75/313 |
| 5,192,617 A | * | 3/1993 | Stofko et al. | 428/411.1 |
| 5,408,019 A | * | 4/1995 | Mertens et al. | 526/220 |
| 5,641,890 A | * | 6/1997 | Wesley et al. | 44/226 |
| 6,124,391 A | * | 9/2000 | Sun et al. | 524/447 |

* cited by examiner

Primary Examiner—Tatyana Zalukaeva
(74) Attorney, Agent, or Firm—Ladas & Parry

(57) ABSTRACT

The invention discloses a process for the preparation of polymeric absorbents useful for gelling organic liquids. The process comprises mixing one or more monomers with a cross-linking agent, a free radical initiator, an optional solvent, optionally in the presence of a transition metal source and subjecting the mixture so obtained to a conventional polymerisation method. The polymer is removed, crushed to obtain polymer powder, washed with solvent and dried by conventional methods to remove unreacted monomers, followed by swelling in alcohols to obtain the desired product.

26 Claims, No Drawings

PROCESS FOR THE PREPARATION OF POLYMERIC ABSORBENTS

FIELD OF THE INVENTION

The present invention relates to a process for the preparation of polymeric absorbents useful for the gelling of organic liquids. More particularly, the present invention relates to a process for the preparation of polymeric absorbents which are cross-linked (5 to 50%) and are capable of absorbing organic liquids in the presence of a ppm level metal additive. The polymers prepared by the process of the present invention have a proper balance of hydrophilic and hydrophobic character in its chemical structure. The polymers prepared by this technique are known in the art as polymer gels or more commonly and hereinafter referred to as gels.

BACKGROUND OF THE INVENTION

Polymer gels consist of cross-linked macromolecules that form a three dimensional network in which solvent molecules are absorbed by osmotic forces. Polymer gels have an equilibrium absorption capacity, which is governed by a balance of osmotic pressure of the solvent and the elastic stress of the network. Polymer gels, which absorb water, are referred to as hydrogels. Those hydrogels, which can absorb large quantities of water, such as in excess of 100 gram of water per gram of dry gel, are called superabsorbants. Polymeric superabsorbents have been widely used in personal care products such as sanitary napkins and diapers. They have also been used in agricultural applications such as for irrigating dry and arid land. Recent developments and new applications of superabsorbents have been outlined in literature (Bucholz, F. L., *Chemtech*, Sep. 38, (1994)). Superabsorbing gels are prepared by polymerising highly hydrophilic monomers such as acrylamide and acrylic acid along with a small quantity of multifunctional monomers and using a suitable initiator, typically a radical initiator, in water as a solvent.

Superabsorbing hydrogels do not absorb organic solvents. In fact, many of them collapse in organic solvents such as acetone and alcohol. Gels, which can absorb organic solvents, have been developed to a limited extent. Examples of such gels are chlorosulfonated polyethylene gels (Varma, A. J., Lele, A. K. and Mashelkar, R. A., *Chem. Engg. Sci.*, 50, 3835 (1995)) and polyethylene oxide gels (Graham, N. B., Nwachuku, N. E. and Walsh, D. J., *Polymer*, 23, 1345 (1982)).

There are several advantages of absorbing organic liquids into gels. For example, the liquid can be transformed into a soft solid by entrapping into a three dimensional matrix of a gel. Soft solids have typical properties that are intermediate between solids and liquids. For example, gelled organic liquids can have a high viscosity as well as a finite modulus. In general, gelled liquids find applications in pastes, lotions, creams, shampoos, oil drilling fluids and in fuels. Gelled fuels are particularly useful for cooking and chafing dishes. They are easier and safer to transport and are more effective owing to the slower diffusive release of the fuel from the gelled matrix. Such gelled fuels typically contain an alcohol, usually methanol or ethanol as the fuel, which may be mixed with other $C_1$ to $C_6$ alcohols. It is desirable to gel the fuel in such a manner that it does not separate from the matrix on standing or on application of pressure.

Alcohol based gels have been formed by different gelling agents. U.S. Pat. No. 3,754,877 discloses the use of olefin modified hydroxyalkyl cellulose as the gelling agent. U.S. Pat. No. 4,436,525 discloses the gelling of a 3:1 mixture of methyl alcohol and isopropyl alcohol with a fatty acid soap and sodium hydroxide. U.S. Pat. No. 3,759,674 discloses the dispersions of ethylene-acrylic acid copolymers and amine emulsifiers in water, which form gels when mixed with alcohols. These gels contain about 10 to 30% by weight of solids. U.S. Pat. No. 3,148,958, U.S. Pat. No. 4,261,700 and U.S. Pat. No. 4,365,971 disclose the use of carboxy vinyl polymers such as Carbopol ethylene acrylic acid copolymer partially neutralised by weak amines as gelling agents for alcohols. U.S. Pat. No. 5,641,890 discloses the use of an amine neutralised anionic polymer such as Carbopol 676 along with an amphoteric Theological additive such as dispersed alumina for gelling alcohol. The gel so formed contains about 20 to 30% by weight of water. The gel is formed by non-covalent physical cross-links originating from interactions between the polymer and the amine. A typical gel contains about 70 weight % alcohol and about 1 weight % each of the polymer and the amine.

While the disclosures referred to above are interesting, they do not provide any teaching as to the structural features of the polymer absorbent. Also, no teaching is provided for synthesizing a solvent absorbing covalently cross-linked polymer gel. Whereas the disclosures of the above references have used a commercial polymer, in the present invention the polymer gel is prepared in situ by polymerizing selected monomers which contain a proper balance of hydrophilic and hydrophobic character in the presence or absence of a suitable transition metal compound. The proper choice of monomers containing hydrophilic and hydrophobic functional groups is particularly necessary for absorption of $C_1$ to $C_6$ alcohol and their mixtures, without the need for presence of water. Also in the prior art, the gels prepared inevitably required additional gels in order to increase the viscosity thereof.

The gel of the invention does not require any other gelling agents besides the polymer itself. The gelled fuels may or may not contain any water. Absence of water can significantly improve the burning characteristics thus giving an improved gel. Polymerisation of the monomer in the presence of a suitable transition metal compound helps in controlling the level of cross-linking reaction as well as forming structural complexes with the organic liquid. This improves the absorption capacity of the polymer for the organic liquid. The gel so prepared does not require any other gelling agent or thickening agent to increase the viscosity besides the polymer unlike the disclosures of the above references.

OBJECTS OF THE INVENTION

It is an object of the invention to provide a polymer gel that can osmotically absorb large quantities of organic solvents to form gelled liquids.

It is another object of the invention to provide polymer gels that can be used for the formation of gelled fuels.

It is further object of the invention to provide a process for the preparation of polymer gels that can be used for preparing gelled fuels useful in cooking and heating food.

It is yet another object to provide polymer gels that do not require further gelling and/or thickening agents to increase the viscosity thereof It is a further object to provide a process for the preparation of polymer gels that have improved absorption capacity for organic liquids, particularly organic solvents.

It is another object of the invention to provide a process for the preparation of polymer gels that absorb $C_1$ to $C_6$ alcohols or mixtures thereof without the need for the presence of water.

SUMMARY OF THE INVENTION

Accordingly, the present invention provides a process for the preparation of polymeric absorbents useful for gelling organic liquids which comprises mixing one or more monomers with a cross-linking agent, a free radical initiator, an optional solvent, optionally in the presence of a transition metal source and subjecting the mixture so obtained to a conventional polymerisation method, removing the polymer, crushing the polymer to obtain polymer powder, washing with solvent, drying the polymer by conventional methods to remove unreacted monomers, followed by swelling in alcohols to obtain the desired product.

In one embodiment of the present invention, the process is optionally carried out in the presence of a transition metal source.

In yet another embodiment of the invention, the source of the transition metal may be metal, metal salts or metal complexes of cobalt, chromium, copper, manganese and iron.

In a further embodiment of the invention, the transition metal source is selected from chromium trioxide, cobalt chloride, manganese hydroxide and ferric oxide.

In a further embodiment of the invention the amount of the transition metal used is between 5 ppm to 500 ppm, preferably between 10 ppm to 250 ppm.

In a further embodiment of the invention, the process is optionally carried out in the presence of a solvent.

In another embodiment of the invention, the solvent used for polymerization are polar or non-polar solvents selected from water or an aqueous mixture of alcohols, 1,4-dioxane, dimethyl sulfoxide and dimethyl formamide, benzene and xylene.

In another embodiment of the invention, the monomers used have a general formula $CH_2=CH-R_1-R_2-R_3$ wherein $R_1$ and $R_3$ are hydrophilic groups that may be either one or a combination of amide, ester, sulfonic acid, carboxylic acid and hydroxyl functional groups, and $R_2$ may be a hydrophobic group chosen from one or a combination of primary, secondary or tertiary aliphatic saturated or unsaturated hydrocarbons, aromatic hydrocarbons, or cycloaliphatic hydrocarbons selected from acrylamide or their derivatives exemplified by various monomers given in Table I below:

TABLE I

Acrylamide derivative 2-acrylamido 2-methypropane sulfonic acid
N-tertiary butylacrylamide
N-octyl acrylamide
Acrylic acid
N-propylacryamide
N-isopropylacrylamide
Ester derivative 2-hydroxyethylmethacrylate
Methylacrylate
Copolymers 2-acrylamido 2-methylpropane sulfonic acid
copolymers with N-alkylacrylamides
Amino acids Acryloyl-4-aminobutyric acid
Acryloyl-6-aminocaproic acid
Acryloyl-11, ω-amino acid
Acryloyl L-leucine TABLE I-continued Acryloyl L-glycine
Acryloyl L-proline
Acryloyl o-alanine
Hydroxyl group Polyethylene glycols
Polyethylene oxide In yet another embodiment of the invention, the amount of the comonomers in the polymerisation mixture may be varied between 1 mole % to 99 mole %, more preferably between 9 to 91 mole %.

In a further embodiment of the invention, the cross-linking agent may be acrylic/methacrylic or styrenic in nature or mixtures thereof and have two or more unsaturations such as N,N-methylene bisacrylamide, ethylene glycol dimethacrylate, ethylene glycol diacrylate, trimethylol propane triacrylate, trimethylol propane trimethylacrylate, divinyl benzene and more preferably N,N-methylene bisacrylamide and ethylene glycol dimethacrylate.

In a further embodiment of the invention, the mole, percent of the multi-functional monomer may be typically between 0.1 mol % and 40 mol %, preferably between 1 mol % and 30 mol % and most preferably between 5 mol % and 20 mol %.

In yet another embodiment of the invention, the initiator used for thermal polymerisation is selected from azo, peroxides, hydroperoxides and persulphates, preferably from azo initiators and persulphates.

In another embodiment of the invention, tetramethyl ethylenediamine in an amount between 1% to 4% of the total feed is used as the polymerisation accelerator along with persulphate initiator in water as the solvent.

In yet another embodiment, the polymerisation of the polymer gel is carried out preferentially thermally between 50 to 90° C. and more preferably between 50 to 70° C.

In yet another embodiment of the invention, the polymer gel may be prepared in water-alcohol mixture in the composition range of 0 to 100 volume percent of alcohol, preferably between 0 to 75 volume percent alcohol. The concentration of the monomer in solution may be varied between 5 to 50 wt. percent, preferably between 5 to 20%.

In another embodiment of the invention, the solvent used for washing is selected from water, acetone, or an aqueous mixture of alcohols.

In a further embodiment of the invention, the polymer gel of the invention is crushed to a soft mass after polymerisation.

In another embodiment of the invention, the organic solvents include aromatics, acids, ketones, alcohols, glycols and amines.

In a further embodiment of the invention, the absorbable organic liquid is selected from aliphatic alcohols, $C_1$ to $C_6$, preferably $C_1$ to $C_3$ and more preferably $C_1$ to $C_2$.

The preferred range of modulus of the swollen polymer gel is between 0.1 to 2 MPa and a preferred range is between 0.2 to 0.6 MPa.

The gelled solvent contains 0.1 to 10 weight percent of a polymer gel, the rest being the organic solvent and/or their mixtures that are osmotically absorbed in the gel. The polymer gel contains hydrophilic and hydrophobic functional groups and is preferably formed by polymerising a vinyl monomer having a chemical structure of the type $CH_2=CH-R_1-R_2-R_3$ wherein $R_1$ and $R_3$ are hydrophilic groups and $R_2$ is a hydrophobic group. The polymerisation is preferably carried out in the presence of ppm levels of a transition metal compound that can complex with the polymer.

Polymerisation can be conducted in any conventional manner. For example, polymerisation can be done by thermal polymerisation, photochemical polymerisation, solution polymerisation, bulk polymerisation, suspension polymerisation, emulsion polymerisation and precipitation polymerisation. In thermal polymerisation the initiator is activated by supplying thermal energy. Photochemical polymerisation may also be done using a radiation source.

Bulk polymerisation is carried out by dissolving the initiator in the liquid monomer. In solution polymerisation, the monomer and the initiator are dissolved in a suitable solvent in which the resultant polymer is soluble or swellable. In the case of suspension polymerisation, the insoluble monomer is suspended in water in the form of droplets with the help of a suspending agent and then polymerised.

In emulsion polymerisation, the monomer is dispersed in aqueous phase as a uniform emulsion and then polymerised. Alternatively, the resulting polymer can also be precipitated from the reaction mixture.

The separation of organic liquid from the gel by the action of temperature of pressure is not preferable. In the present invention, the organic liquid is osmotically absorbed in the gel due to the action of strong intermolecular forces. The gel does not contain macroporosity and hence the solvent cannot separate from the gel on the application of pressure. The choice of monomers also ensures that the organic solvent does not separate from the gel due to the change in temperature.

The process of the present invention will now be described with reference to the following examples, all of which are illustrative and are not to be construed as limiting the scope of the invention in any manner.

EXAMPLE 1

To a well stirred solution of 1 mole of Acrylamido-2-methyl-propane sulfonic acid (AMPS), containing 20 ml of distilled water, 0.154 gm of $N,N^1$-methylene bisacrylamide (Bis-Am), 0.04 gm ammonium persulfate (APS) and 0.06 ml tetraethylene methylene diamine (TEMED) were added slowly. The contents were thoroughly mixed and the solution degassed by $N_2$ gas bubbling through it for 10–15 minutes. The tubes were then sealed and polymerisation was carried out at 60° C. for 24 hours. After the polymerisation, the polymer rod was taken out of the tube and washed with water for 24 hours, dried and then crushed in a mortar

| S. No | Polymer Gels with mole percentage of crosslinking | Swelling ratio in methanol (g/g) | Swelling ratio in ethanol (g/g) |
|---|---|---|---|
| 1 | PAMPS gel with 10 mole percent crosslinking | 51.4 | 55.82 |
| 2 | PAMPS gel with 20 mole percent crosslinking | 16.84 | 18.98 |
| 3 | PAMPS gel with 30 mole percent crosslinking | 11.12 | 10.21 |

EXAMPLE 2

To a well stirred solution of 1 mole of AMPS containing 20 ml of distilled water with 125 ppm transition metal, 0.308 gm of Bis-Am, 0.04 gm APS and 60 µl TEMED were added slowly. The contents were thoroughly mixed and the solution degassed by $N_2$ gas bubbling through it for 10–15 minutes. The tubes were then sealed and polymerisation was carried out at 60° C. for 24 hours. After the polymerisation, the polymer rod was taken out of the tube and washed with water for 24 hours, dried and then crushed in a mortar.

| S. No | Polymer Gels with mole percentage of crosslinking | Amount of transition metal | Swelling ratio in methanol | Swelling ratio in ethanol |
|---|---|---|---|---|
| 1 | PAMPS gel with 20 mole percent crosslinking | 0.2 gm. $CoCl_2$ | 23.58 | 23.78 |
| 2 | PAMPS gel with 20 mole percent crosslinking | 0.002 gm $CrO_3$ | 31.14 | 29.88 |
| 3 | PAMPS gel with 10 mole percent crosslinking | 0.002 gm $CrO_3$ | 99.89 | 97.61 |

EXAMPLE 3

To a well stirred solution of 1 mole of N-tertiary butylacrylamide (N-t-BAm) containing 23 ml dimethyl sulfoxide (DMSO), 0.1 mole of AMPS, 0.154 gm Bis-Am, 0.08 gm azobisisobutyronitrile (AIBN) were added slowly. The contents were thoroughly mixed and the solution degassed by $N_2$ gas bubbling through it for 10–15 minutes. The tubes were then sealed and polymerisation was carried out at 60° C. for 24 hours. After the polymerisation, the polymer rod was taken out of the tube and washed with water for 24 hours, dried and then crushed in a mortar.

| Polymer gel with mole percent crosslinking | Swelling ratio in methanol (g/g) | Swelling ratio in ethanol (g/g) |
|---|---|---|
| N-t-BA, co-AMPS gel (1.0:0.1 mole ratio) with 10 mole percent crosslinking | 352.81 | 389.72 |

EXAMPLE 4

In another case, 0.1 mole of N-tertiary butylacrylamide (N-t-BAm) is dissolved in 20 ml of water by heating it at 50° C. To this well dissolved solution, 1 mole of AMPS, 0.154 gm of Bis-Am, 0.04 gm APS, 60 µl TEMED were added slowly. The contents were thoroughly mixed and the solution degassed by $N_2$ gas bubbling through it for 10–15 minutes. The tubes were then sealed and polymerisation was carried out at 70° C. for 24 hours. After the polymerisation, the polymer rod was taken out of the tube and washed with water for 24 hours, dried and then crushed in a mortar.

EXAMPLE 5

To a well stirred solution of 1 mole of N-isopropylacrylamide (N-t-BAm) containing 23 ml 1,4-dioxane, 0.154 gm Bis-Am, 0.08 gm AIBN were added slowly. The contents were thoroughly mixed and the solution degassed by $N_2$ gas bubbling through it for 10–15 minutes. The tubes were then sealed and polymerisation was carried out at 60° C. for 24 hours. After the polymerisation, the rod was taken out of the tube and washed with water for 24 hours, dried and then crushed in a mortar.

| S. No. | Polymeric networks | Swelling ratio in ethanol |
|---|---|---|
| 1 | NIPAm gel with 10 mole percent crosslinking | 29.31 |
| 2 | NIPAm gel with 20 mole percent crosslinking | 17.22 |

EXAMPLE 6

To a well-stirred solution of 1 mole of AMPS monomer containing 10 ml, 75:25 ethanol-water mixture, 0.154 gm Bis-Am, 0.08 gm azobisisobutyronitrile (AIBN) were added. The contents were thoroughly mixed and the solution degassed by $N_2$ gas bubbling through it for 10–15 minutes. The tube was then sealed and polymerisation was carried out at 60° C. for 24 hours. After the polymerisation, the rod was taken out of the tube and washed with water for 24 hours, dried and then crushed in a mortar.

EXAMPLE 7

To a clear solution of 2-hydroxy ethyl methacrylate, 0.08 gm AIBN were added slowly. The contents were thoroughly mixed and the solution degassed by $N_2$ gas bubbling through it for 10–15 minutes. The tubes were then sealed and polymerisation was carried out at 60° C. for 24 hours. After the polymerisation, the rod was taken out of the tube and washed with water for 24 hours, dried and then crushed in a mortar.

EXAMPLE 8

To a clear solution of 1.85 gms of acryloyl 6-aminocaproic acid containing 23 ml 1,4-dioxane, 0.136 ml of ethylene glycol dimethacrylate, 0.08 gm AIBN were added slowly. The contents were thoroughly mixed and the solution degassed by $N_2$ gas bubbling through it for 10–15 minutes. The tubes were then sealed and polymerisation was carried out at 70° C. for 24 hours. After the polymerisation, the rod was taken out of the tube and washed with water for 24 hours, dried and then crushed in a mortar.

| S. No | Polymeric networks | Swelling ratio in ethanol |
|---|---|---|
| 1 | Acryloyl-4-aminobutyric acid | 15.31 |
| 2 | Acrylol-6-aminocaproic acid | 8.05 |
| 3 | Acryloyl-1,ω-aminoundecanoic acid | 12.92 |

EXAMPLE 9

In the present invention, the modulus of the swollen PAMPS gels with different degree of cross-linking is measured by a compression test in which the gel is compressed to controlled strains (α) and the stress required for compression (σ) is recorded. The relation between the stress and the strain for a swollen polymer gel is given by $$\sigma = \gamma kT(\alpha - 1/\alpha^{"2})$$

The plot of σ versus $(\alpha - 1/^2)$ gives the modulus as the slope of the line. A soft polymer gel has a finite modulus, which is directly proportional to the crosslink density of the gel. In the present invention the modulus of the PAMPS increases as crosslink density increases. Its non-flowing nature and finite modulus define the solid nature of the organic liquid absorbed gels.

EXAMPLE 10

This example shows the heating efficiency of the polymer gel prepared by the process of the present invention. One container is placed under a chafing dish containing 2–3 litres of water at 25° C. in the water pan portion of the chafing dish and an equal quantity of water (25° C.) in the food pan. This container is heated by the aid of alcohol absorbed PAMPS gel with 10 mole percent crosslinker (Example 1), and from the thermocouples in the water pan and food pan the temperatures of water in these pans are recorded. The average data of the runs are as follows:

| Temperature (° C.) | Time (minutes) |
|---|---|
| 25 (water pan) | 0 |
| 25 (food pan) | 0 |
| 68 (food pan) | 30 |
| 82 (water pan) | 30 |
| 91 (food pan) | 45 |
| 96 (water pan) | 45 |

EXAMPLE 11

This example shows the heating efficiency of the polymer gel prepared by the process of the present invention. One container is placed under a chafing dish containing 2–3 litres of water at 31° C. in the water pan portion of the chafing dish and an equal quantity of water (29° C.) in the food pan. This container is heated by the aid of N-tertiarybutylacrylamide copolymer with AMPS, 10 mole percent crosslinker (Example 3), and from the thermocouples in the water pan and food pan the temperatures of water in these pans are recorded. The average data of the runs are as follows:

| Temperature (° C.) | Time (minutes) |
|---|---|
| 29 (food pan) | 0 |
| 31 (water pan) | 0 |
| 78 (food pan) | 15 |
| 89 (water pan) | 15 |
| 92 (food pan) | 30 |
| 97 (water pan) | 30 |

Advantages of the Invention

The process of the invention provides a method for the preparation of slightly cross-linked polymers that are capable of absorbing organic liquids in the presence of a ppm additive. The process of the invention more particularly provides a slightly cross linked polymers that are capable of absorbing alcohols due to a balanced hydrophilic and hydrophobic character in their chemical structure.

The process being generic in nature can be extended to synthesis of gels as absorbents for various other substrates of importance.

What is claimed is:

1. A process for the preparation of polymeric absorbents useful for gelling organic liquids consisting essentially of:
   a) mixing in situ one or more monomers comprising multiflinctional monomers, wherein the monomer contains a hydrophobic group and hydrophilic group; and with a cross linking agent and a free radical initiator;
   b) subjecting the mixture to polymerization in the presence of a transition metal source;
   c) removing the polymer;
   d) crushing the polymer to obtain a polymer powder;

e) washing with a solvent;
f) drying the polymer to remove unreacted monomers; and
g) swelling the polymer in an alcohol to obtain the polymeric absorbent.

2. The process as claimed in claim 1, wherein the one or more monomers are polymerized in the presence of a solvent.

3. The process as claimed in claim 1, wherein the transition metal source is selected from the group consisting of metal, metal salts, and metal complexes of cobalt, chromium, copper, manganese and iron.

4. The process as claimed in claim 3, wherein the transition metal source is selected from the group consisting of chromium trioxide, cobalt chloride, manganese hydroxide and ferric oxide.

5. The process as claimed in claim 1, wherein the transition metal source is in an amount between 10 ppm to 250 ppm.

6. The process as claimed in claim 2, wherein the solvent is selected from the group consisting of water, alcohol, 1,4-dioxane, dimethyl sulfoxide, dimethyl formamide, benzene, xylene and mixtures thereof.

7. The process as claimed in claim 1, wherein one or more monomers are of the formula $CH_2=CH-R_1-R_2-R_3$ wherein $R_1$ and $R_3$ are hydrophilic groups and $R_2$ is a hydrophobic group.

8. The process as claimed in claim 7, wherein $R_1$ and $R_3$ are each selected from the group consisting of amide, ester, sulfonic acid, carboxylic acid, hydroxyl functional groups and mixtures thereof.

9. The process as claimed in claim 7, wherein $R_2$ is selected from the group consisting of primary, secondary or tertiary aliphatic saturated or unsaturated hydrocarbons selected from acrylamides and derivatives thereof listed in the Table below:

| Acrylamide derivative |
| --- |
| 2-acrylamidro 2-methypropane sulfonic acid |
| N-tertiary butylacrylamide |
| N-octylacrylamide |
| Acrylic acid |
| N-propylacryamide |
| N-isopropylacrylamide |
| Ester derivative |
| 2-hydroxyethylmethacrylate |
| Methylacrylate |
| Copolymers |
| 2-acrylamido 2-methylpropane sulfonic acid copolymers with N-alkylacrylamides |
| Amino acids |
| Acryloyl-4-aminobutyric acid |
| Acryloyl-6-aminocaproic acid |
| Acryloyl-11, ω-amino acid |
| Acryloyl L-leucine |
| Acryloyl L-glycine |
| Acryloyl L-proline |
| Acryloyl o-alanine |
| Hydroxyl group |
| Polyethylene glycols |
| Polyethylene oxide | and mixture thereof.

10. The process as claimed in claim 1, wherein the one or more monomers in the polymerization mixture is between 1 mole % to 99 mole %.

11. The process as claimed in claim 1, wherein the one or more monomers in the polymerization mixture is between 9 mole % to 91 mole %.

12. The process as claimed in claim 1, wherein the cross-linking agent is selected from an acrylic, methacrylic, styrenic group, or a mixture thereof.

13. The process as claimed in claim 12, wherein the cross-linking agent is selected from the group consisting of N, N-methylene bisacrylamide, ethylene glycol dimethacrylate, ethylene glycol diacrylate, trimethylol propane triacrylate, trimethylol propane trimethylacrylate, divinyl benzene and mixtures thereof.

14. The process as claimed in claim 13, wherein the cross-linking linking agent is selected from N, N-methylene bisacrylamide and ethylene glycol dimethacrylate.

15. The process as claimed in claim 1, wherein the mole percent of the multifunctional monomer is in the range of 0.1 mole % to 40 mole %.

16. The process as claimed in claim 1, wherein the mole percent of the multifunctional monomer is in the range of 1 mole % to 30 mole %.

17. The process as claimed in claim 1,wherein the mole percent of the multifunctional monomer is in the range of 5 mole % to 20 mole %.

18. The process as claimed in claim 1, wherein the free radical initiator is selected from the group consisting of azo groups, peroxides, hydroperoxides, persulphates and mixtures thereof.

19. The process as claimed in claim 18, wherein the free radical initiator is selected from azo and persulphates.

20. The process as claimed in claim 1, further comprising tetramethyl ethylenediamine as a polymerization accelerator in an amount between 1% to 4% of the monomer wherein the free radical initiator of a) is a persulphate, and is used in water.

21. The process as claimed in claim 1, wherein the polymerization is carried out at a temperature in the range of 50–90° C.

22. The process as claimed in claim 21, wherein the polymerization is carried out at a temperature in the range of 50–70° C.

23. The process as claimed in claim 1, wherein the polymeric absorbent is prepared in a water-alcohol mixture in the composition range of greater than 0 to 100 volume percent of alcohol.

24. The process as claimed in claim 23, wherein the polymeric absorbent is prepared in a water-alcohol mixture in the composition range of greater than 0 to 75 volume percent of alcohol.

25. The process as claimed in claim 1, wherein the one or more monomers have a concentration in the range of 5–50 wt. %.

26. The process as claimed in claim 1, wherein the one or more monomers have a concentration in the range of 5–20 wt. %.

* * * * *